(12) United States Patent
Sperry

(10) Patent No.: US 7,784,102 B2
(45) Date of Patent: Aug. 24, 2010

(54) METHOD FOR SECURE ACCESS TO DOCUMENT REPOSITORIES

(75) Inventor: Robert Hammond Sperry, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1286 days.

(21) Appl. No.: 11/300,974

(22) Filed: Dec. 15, 2005

(65) Prior Publication Data

US 2007/0143618 A1    Jun. 21, 2007

(51) Int. Cl.
*G06F 21/24* (2006.01)

(52) U.S. Cl. .................. 726/27; 726/3; 726/21; 713/176

(58) Field of Classification Search ............... None
See application file for complete search history.

(56) References Cited

U.S. PATENT DOCUMENTS

| 4,728,984 | A | 3/1988 | Daniele |
| 4,821,029 | A | 4/1989 | Logan et al. |
| 5,604,027 | A | 2/1997 | Sheridon |
| 5,723,204 | A | 3/1998 | Stefik |
| 5,991,469 | A | 11/1999 | Johnson et al. |
| 6,763,464 | B2 * | 7/2004 | Wang et al. ............ 713/193 |
| 6,816,969 | B2 | 11/2004 | Miyazaki et al. |
| 6,833,927 | B2 | 12/2004 | Gusmano et al. |
| 6,856,432 | B2 | 2/2005 | Bobrow et al. |
| 6,978,366 | B1 * | 12/2005 | Ignatchenko et al. ...... 713/166 |
| 7,127,431 | B2 * | 10/2006 | Kambayashi et al. ...... 705/57 |
| 7,149,722 | B1 * | 12/2006 | Abburi ................... 705/59 |
| 7,380,120 | B1 * | 5/2008 | Garcia .................. 713/160 |
| 7,434,048 | B1 * | 10/2008 | Shapiro et al. ........... 713/165 |
| 7,624,451 | B2 * | 11/2009 | Peinado ................. 726/26 |
| 2003/0182475 | A1 * | 9/2003 | Gimenez ................ 710/8 |

* cited by examiner

*Primary Examiner*—Minh Dinh
(74) *Attorney, Agent, or Firm*—Pepper Hamilton LLP

(57) ABSTRACT

A method for the secure access of files within a document repository includes the use of a Document Access Document with digitally signed and encoded conditions of use, such that the Document Access Document serves as a physical access credential to its specified documents within the repository.

14 Claims, 5 Drawing Sheets

METHOD FOR SECURE ACCESS TO DOCUMENT REPOSITORIES

BACKGROUND

1. Technical Field

The disclosed embodiments generally relate to the field of electronic document retrieval.

2. Description of the Related Art

The disclosed embodiments relate generally to the access of documents within a document repository. A document repository may be any database or other group of documents that are stored electronically and available for digital distribution. Documents within a repository may be generated in digital form by scanning devices or by multifunction devices such as those that provide scanning, printing, and/or facsimile capability. Through the use of document distribution software, the digital information that is generated by these devices may be sent to multiple applications, including document repositories. The Flowport™ software available from Xerox Corporation and described in U.S. Pat. No. 6,833,927, the disclosure of which is incorporated by reference herein in its entirety, is an example of document distribution software designed to merge paper documents into E-mail, workflow, and document management systems. It performs the functions of distributing, retrieving and storing digital documents generated by scanning paper documents. One of the features of this type of software is its ability to analyze image data for instructions regarding the handling of the document data.

The Flowport™ software is set up to scan commands from a paper user interface that is generated by the user. The user simply fills out a form and directs, by an appropriate, menu driven user interface, the multifunction process controller to recognize the machine readable digital information. Thus, paper documents containing digital information may be sent through a communications medium. U.S. Pat. No. 6,856,432, the disclosure of which is incorporated by reference herein in its entirety, describes a program storage device that is readable by a machine, where the machine has a program of instructions to extract information from a message received through, for example, a facsimile communication medium. The extracted information is used to convert the message and send the converted message through a network communication medium.

File access to documents within a controlled access document repository is currently limited to individuals having accounts on that repository and who are authorized via the access control list for the particular document that he or she wishes to retrieve. When document owners wish to provide controlled access of documents to individuals who do not have accounts on a specific repository, a copy of the document must be mailed to the individual, or the individual must be provided with an identification name/number and password that must be entered to retrieve the document electronically. It is therefore desirable to provide controlled or limited electronic access to documents in a document repository to individuals who do not have accounts on that repository.

A common method of protecting digital information that is communicated across networks is by encoding the information that is to be protected to assure access to authorized users only, and through the use of digital signatures to provide non-repudiation of the authenticity of the information. Machine readable digital information is often encoded in data glyphs on the face of the document. Data glyphs are two dimensional bar codes that can encode digital information, as described in U.S. Pat. No. 5,991,469, the disclosure of which is incorporated by reference herein in its entirety. However, bar codes or any other techniques for encoding data may be used. Data glyphs are often utilized because they possess error resistant qualities and are amenable to being used in facsimiles and printers without losing the capability of storing encoded data that may still be interpreted after being transmitted. Moreover, data glyphs also retain their error resistant qualities after repeated transmissions. A document containing data glyphs, whether represented electronically or printed in hard copy, can carry an encoded description of itself. The document may include one or more of a variety of types of fields, as well as other non-field information, and the encoded information is integrated into the electronic and printed representations of the document. In the hard copy representation of the document, this encoded information may be printed on the face of the document. In the electronic representation of the document, the encoded information may be part of the data structure of the document.

The document interpreter may read the document's field description from the document itself and, based on this description, interpret the document. U.S. Pat. No. 4,728,984, the disclosure of which is incorporated by reference herein in its entirety, describes a machine such as an electrophotographic printing machine that scans a paper document and converts or decodes the image signals located on the document for authorized users only. Where information secrecy is paramount, the document image containing the secret information may be encoded or encrypted to enable the document or document copies to be mailed or exchanged without revealing to non-authorized persons the document content. If the decoder is not enabled by a recognized authorized user, the machine duplicates the original document so that the content remains encoded.

While the availability of digital technology enables the efficient creation and distribution of digital documents, the threat of piracy is an overarching concern. A common method for guaranteeing the legitimacy of digital information is digital signature technology. Digital signature technology provides a function corresponding to conventional signatures for electronic digitized data such as documents (also referred to as multimedia data). U.S. Pat. No. 6,816,969, the disclosure of which is incorporated by reference herein in its entirety, provides a description of digital signature technology. In digital signature technology, a digital signature generator applies a private key, which the generator keeps secret, to digitized data (hereinafter referred to as message M) to be signed or a hash value thereof, a hash value being a characteristic value for the message (also referred to as a compression value or message digest). From this, a digital signature A for the message M is generated. The digital signature A is then added to the message M and made public. A digital signature verifier compares the message M or the hash value thereof to the result obtained from applying a public key corresponding to the private key to the digital signature A added to the message M. If the two do not match, the message M may have been tampered with after the digital signature A was generated. Thus, if the two do match, it confirms that the digital signature A was generated for the message M.

The disclosure contained herein describes attempts to address one or more of the problems described above.

SUMMARY

In an embodiment, a document includes an instruction channel containing machine-readable code. The machine-readable code may include (i) data representative of a location of a target file that is stored in a content repository; (ii) data representative of one or more conditions for retrieval of the target file from the content repository; and (iii) a digital signature. The digital signature indicates whether a holder of the document is authorized to access the target file. Optionally, the document may also include a human-readable channel containing text that is descriptive of the target file. The text in the human-readable channel may also include, for example, text that is descriptive of one or more of the conditions for retrieval.

Optionally, the data representative of one or more conditions for retrieval may represent a number of times that a user may use the document to access the target file, and/or it may represent a time limitation on access of the target file.

In an alternate embodiment, a method of retrieving a document from a document repository includes: (i) reading machine-readable code contained on a document, where the machine-readable code contains data that is descriptive of a target file that is stored in a document repository; and (ii) verifying a digital signature on the document. If the verifying determines that the digital signature is permitted to access the target file, the method may also include automatically retrieving the target file from the document repository, and automatically delivering the target file to a target device. The verifying may include validating whether the document repository has granted access to the target file, such as by applying a public key to the digital signature.

Optionally, the machine-readable code may include data glyphs. Also optionally, the target device may include a printing device, and the delivering may include printing the target file on the printing device. Alternatively, the target device may include a combination scanner and printing device, the scanning may be performed by the target device, and the delivering may include printing the target file on the target device.

In an alternate embodiment, a method of creating a document access document that controls delivery of a target file from a document repository includes: (i) identifying a target file that is stored in a location in a document repository; (ii) receiving at least one condition for access of the target file; and (iii) creating a document access document. The document access document contains machine-readable code, wherein the code includes a digital signature, data corresponding to the file location, and data corresponding to the at least one condition for access. The digital signature may include an indication of whether a holder of the document is permitted to access the target file.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

In accordance with one embodiment, a Document Access Document contains machine-readable, encoded information that provides information needed to retrieve a target file or files from a document repository. This information is digitally signed using the private key of the document repository. A "Document Access Document" may be a single page of printed material, or it may include multiple pages of printed material in some embodiments. The page may be physical, such as paper or other hard copy print material, or it may be electronic, such as electronic paper, a tablet computer display, or other media, so long as it contains printed material that is visible to a human and a machine. Examples of electronic paper are disclosed in U.S. Pat. Nos. 5,723,204 and 5,604,027, the disclosures of each of which are fully incorporated herein by reference.

Figure 1:
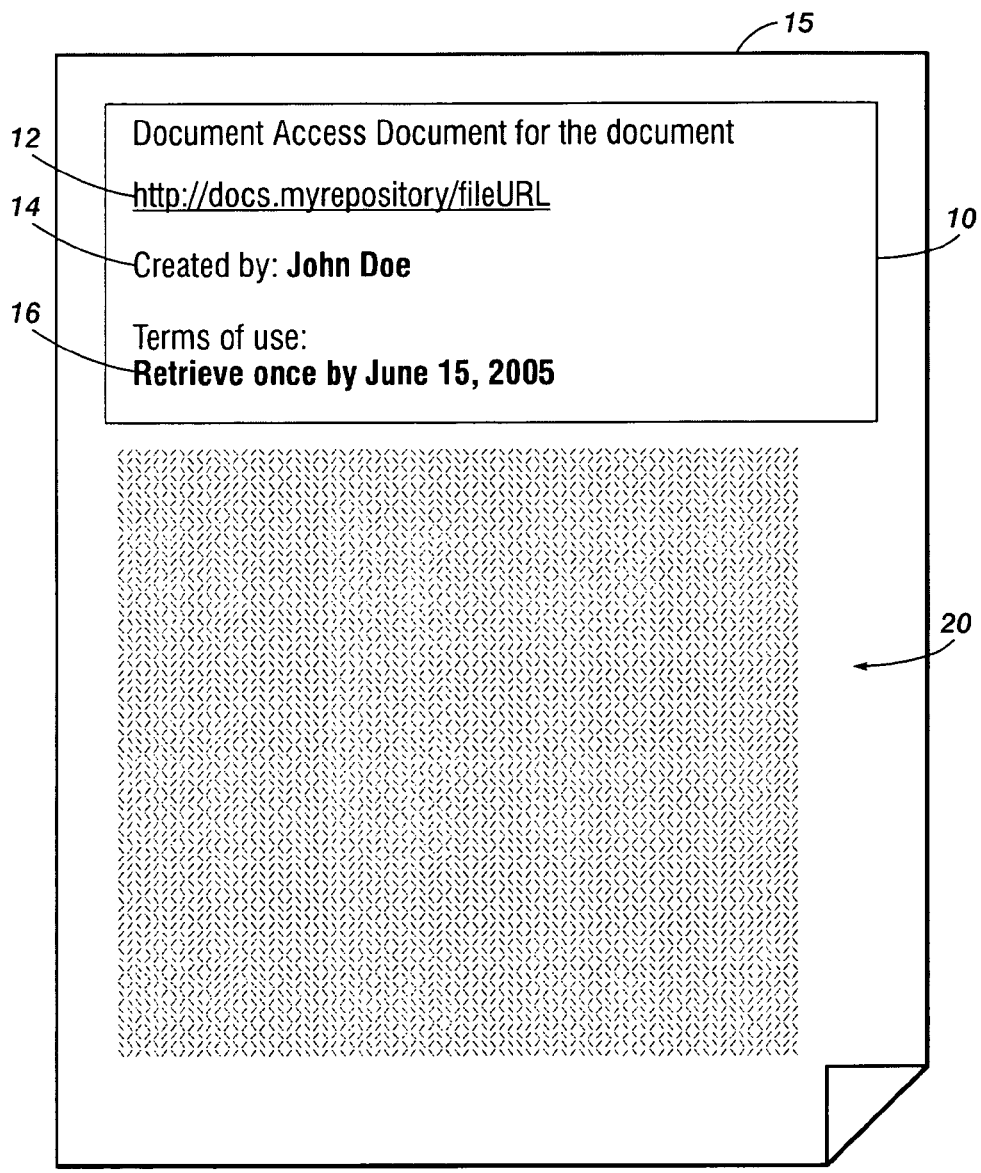
FIG. 1 depicts an exemplary embodiment of a cover page of an exemplary Document Access Document.

For example, as illustrated in FIG. 1, a Document Access Document 15 may include a channel 10 comprising humanly readable information such as a description of access rights to a target file, which may include a document or documents, directed to the holder of the Document Access Document. A "channel" is used to describe a partition, section, or collection of data within the Document Access Document where the collection of data or information located within each channel has similar readable capabilities, such as, for example, machine readable or humanly readable. The humanly readable information may include but is not limited to, for example, the file location of the target file to which the Document Access Document permits access 12, the author or creator of the target file, and/or the title of the target file or its documents, denoting which document repository or group of documents the Document Access Document grants access to. The description of access rights may describe the terms of use 16 of the Document Access Document such as, for example, allowing one-time use only, only allowing a certain number of prints or access attempts, not permitting use until a specified date, not permitting use until a specified date has expired, or providing for delivery by mail to specified recipients.

The Document Access Document also includes an instruction channel 20 comprising machine readable instructions for fetching the target file. The machine readable instructions may comprise, for example, the location of the target file or files that are linked to the Document Access Document, and rights management language that outlines the conditions for retrieval of the document. The conditions for retrieval of the target file may include, for example, the conditions set forth in the humanly readable channel. Further instructions that may be unknown to the holder of the Document Access Document may also be set forth, such as the addresses of authorized recipients, or the period of time that the document or documents in the target file will be made available.

The machine readable instructions of instruction channel 20 may be encoded using any now or hereafter existing encoding form, such as data glyphs or other high density bar codes. A digital signature may be created using the encoded information. As such, the Document Access Document may itself be the sole access key to the corresponding target file, document or documents in the specified document repository. Any holder of the Document Access Document may use it, in accordance with the terms of use only, to access the corresponding document or documents in the specified document repository.

It should be noted that channels 10 and 20 have been depicted in their particular locations in FIG. 1 by way of example only, and may be located anywhere on the cover page(s) or elsewhere in the Document Access Document 15.

Figure 2:
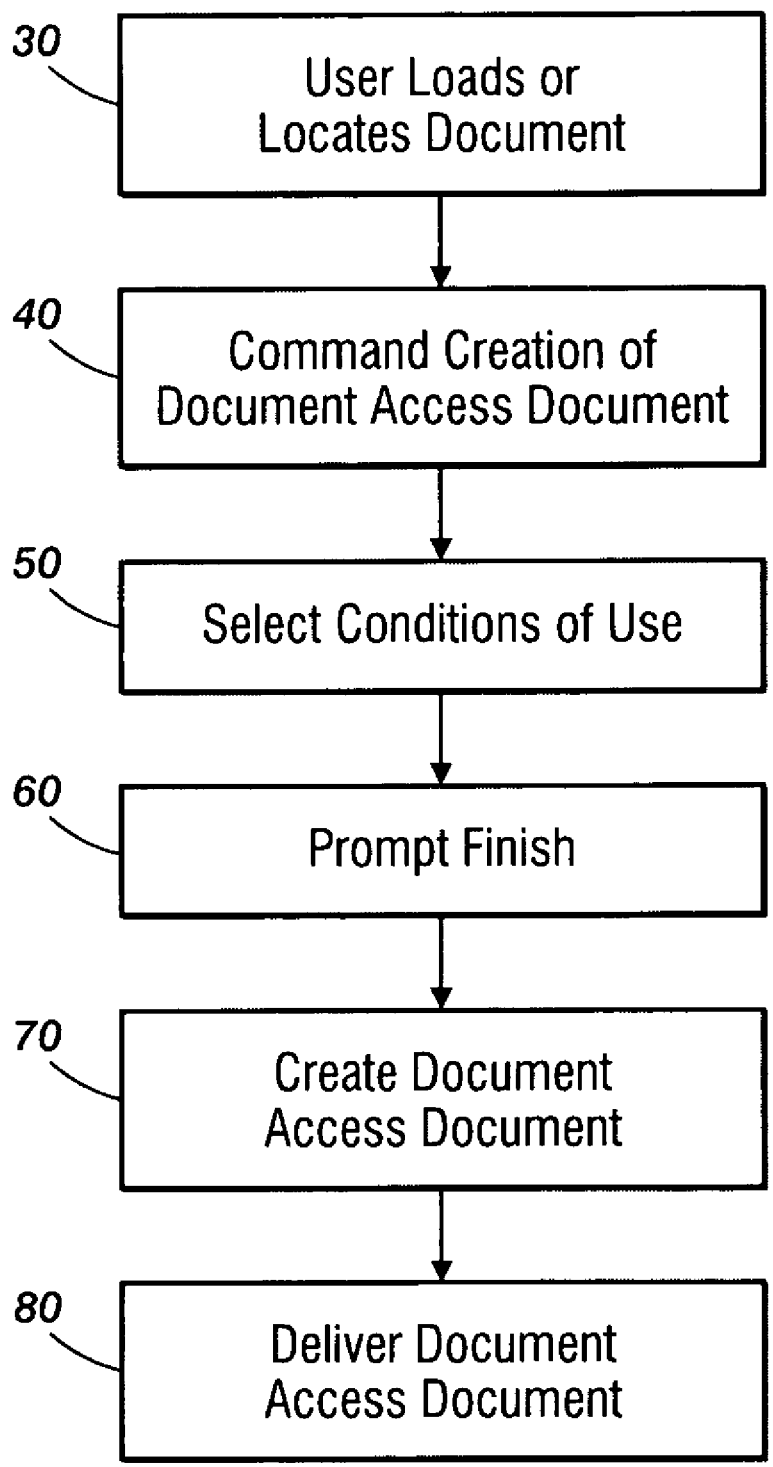
FIG. 2 depicts an exemplary embodiment of a method of creating a Document Access Document.

The Document Access Document may be created according to steps such as those depicted in FIG. 2. A user logs into a document repository service via any machine connected to a communications medium, such as a computer and database, and the user may upload or locate the document or documents for linkage to a particular Document Access Document 30. The repository service may use any suitable method available for assuring that only authorized users are allowed to create Document Access Documents, such as requiring an identifier and password. A command menu may allow the user to choose to create a Document Access Document 40, at which time the user may be prompted to enter information into a dialogue box regarding the conditions of use 50. The conditions of use may be chosen by a drop down menu, or entered directly by the user, or selected by any other suitable method. Conditions of use may include, for example, allowing one-time use only, only allowing a certain number of prints or access attempts, not permitting use until a specified date, not permitting use until a specified date has expired, or providing for delivery by mail to specified recipients. The user prompts the repository that he or she is finished creating the Document Access Document 60, such as, for example, by entering the word "done," or "finished," or choosing a similar command from a drop-down or clickable menu. The repository service creates a Document Access Document that includes the appropriate humanly readable and machine readable information regarding the conditions of use, digitally signs that document using its private key, and delivers the Document Access Document to the user or to the recipients specified by the user. Document distribution software such as the Flowport™ software available from Xerox may be used to deliver the Document Access Document through any network communications medium where the user may retrieve it via e-mail, facsimile, printer or another suitable medium or device.

Figure 3:
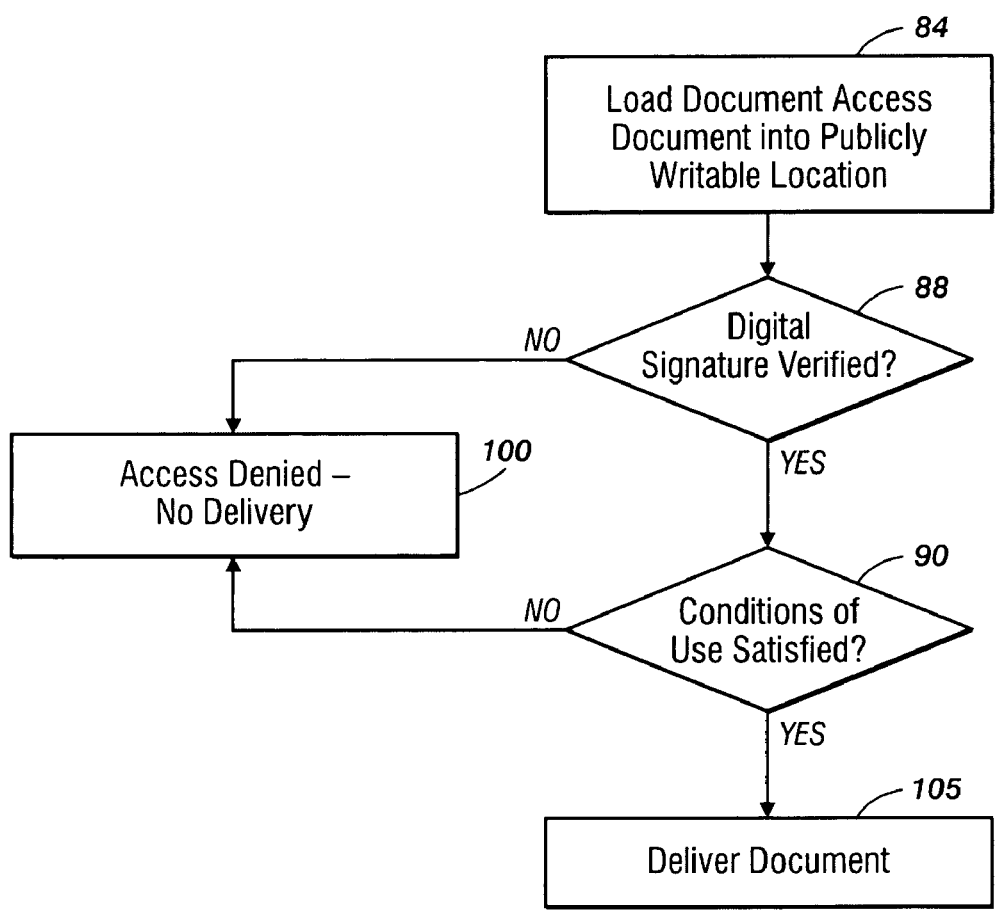
FIG. 3 depicts an exemplary embodiment of a method of retrieving a document or documents from a document repository through the use of a Document Access Document where the document or documents are delivered to a workstation.
Figure 4:
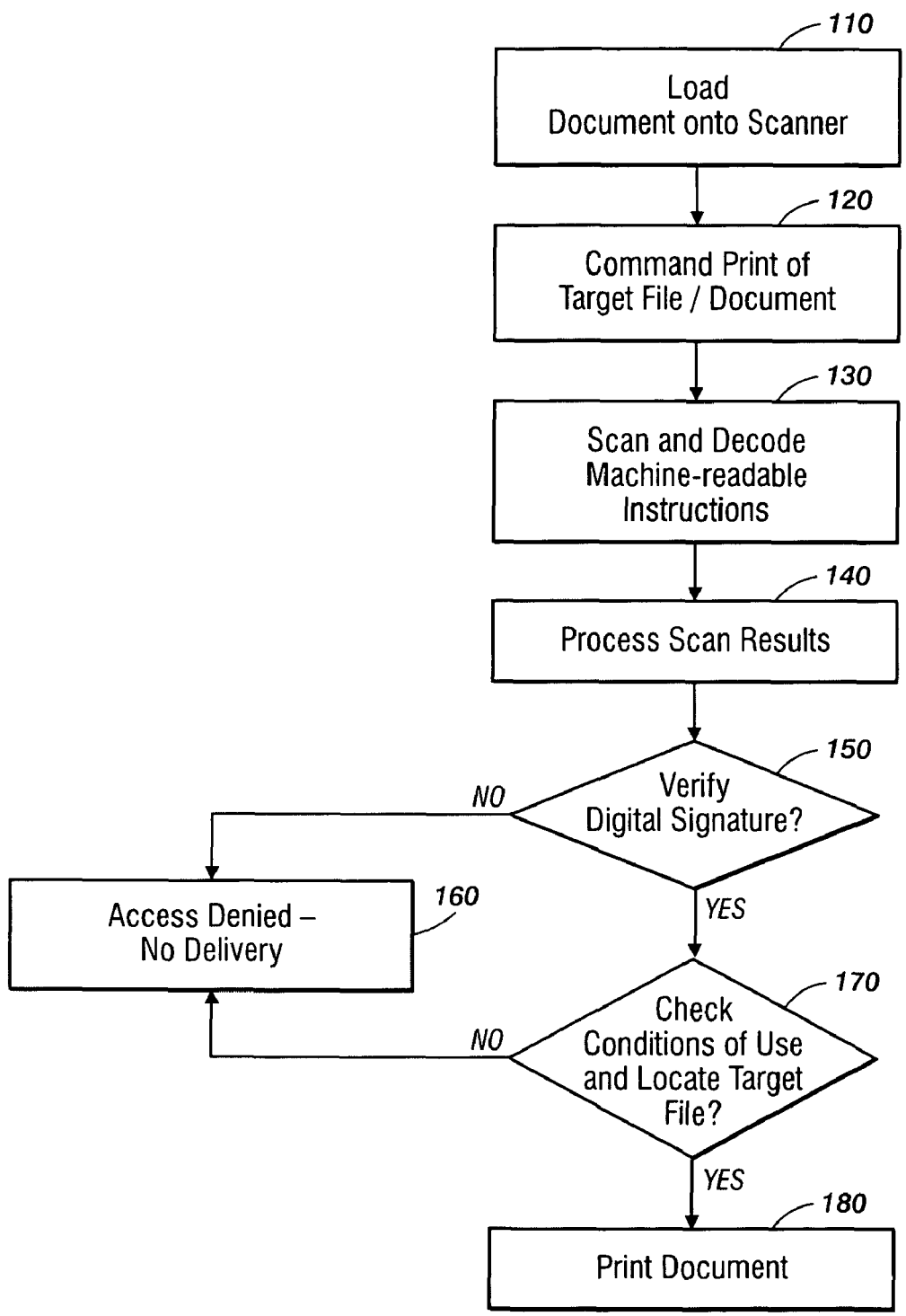
FIG. 4 depicts an exemplary embodiment of a method of retrieving a document or documents from a document repository through the use of a Document Access Document where the document or documents are delivered to a machine with printing capabilities.

The holder of a Document Access Document (hereinafter "holder") may use the Document Access Document as an access credential to retrieve one or more files or documents from the repository according to one or more steps, such as those depicted in FIG. 3 and FIG. 4. If the holder prefers to request delivery of the document or documents as a target file directly to a workstation such as a computer, personal digital assistant, multifunction printer or other device, the holder may open a connection to the repository, and store the Document Access Document into a publicly writeable location on the repository 84. Storage may be done by, for example, scanning and digitizing the Document Access Document, or by reading the instructions in the Document Access Document's instruction channel using any suitable character recognition method or device.

A digital signature verifier of any type known in the art may access the data present in the machine-readable instruction channel and compares the signature of the Document Access Document or the hash value thereof to the result obtained from applying a public key corresponding to the private key to the digital signature added to the Document Access Document 88. If the two do not match, or if the digital signer of the document does not have the authority to grant access, access to the repository may be denied and no documents may be delivered 100. If the two match, a document interpreter within the document repository may decode and read the document's information located in the machine readable instruction channel, and a document distribution processor may direct the digital data file of the document or documents to deliver the target file or its document(s) 105 according to the conditions of use 90. Otherwise, access to the repository may be denied and no documents may be delivered 100.

Other information associated with the Document Access Document may also permit or deny delivery. For example, if conditions of use are available 90, if the conditions allow for one-time use only, and the Document Access Document has already been used once, the repository will not send or allow access to the requested document or documents. If the conditions allow for use only after a particular date, and that date has not yet passed, the repository will not deliver or allow access to the requested document or documents.

The instructions may be analyzed and processed in accordance with document distribution software such as the Flowport™ software available from Xerox Corporation. The distribution may be accomplished by any appropriate communication medium, such as a network that in turn may serve a variety of destinations such as remote printer, Internet server, an e-mail address, assorted applications, storage repository, and many other functions.

If the holder prefers to request delivery of the document or documents from a machine with printing capabilities such as a printer, copier, facsimile, or multifunction machine such as that described in U.S. Pat. No. 5,991,469, the disclosure of which is incorporated by reference herein in its entirety, the holder places or loads the paper Document Access Document onto an optical scanning device or other means of converting a document to a digital format 110. The holder may select a command from the machine's user interface that directs the machine to print a target file's document or documents from a Document Access Document 120. The optical scanner located on the machine detects the bar code, glyph or other data located in the machine readable information channel and decodes the markings 130. The digital output of the scanner may be processed or sent to a document distribution processor to control distribution of the target file. A digital signature verifier within the processor compares the signature of the Document Access Document or the hash value thereof to the result obtained from applying a public key corresponding to the private key to the digital signature added to the Document Access Document 80. If the two do not match, no documents may be printed 90. If the two match, the software may direct the processor to read the document's information located in the machine readable channel. If the conditions of use allow it, the distribution processor directs 170 the digital data file of the document or documents according to the conditions of use to the machine, and the machine prints the document or documents 100.

Other information associated with the Document Access Document may also permit or deny delivery. For example, if the conditions allow for one-time use only, and the Document Access Document has already been used once, the repository will not deliver the requested document or documents to the machine. If the conditions allow for use only after a particular date, and that date has not yet passed, the repository will not deliver the requested document or documents to the machine.

Figure 5:
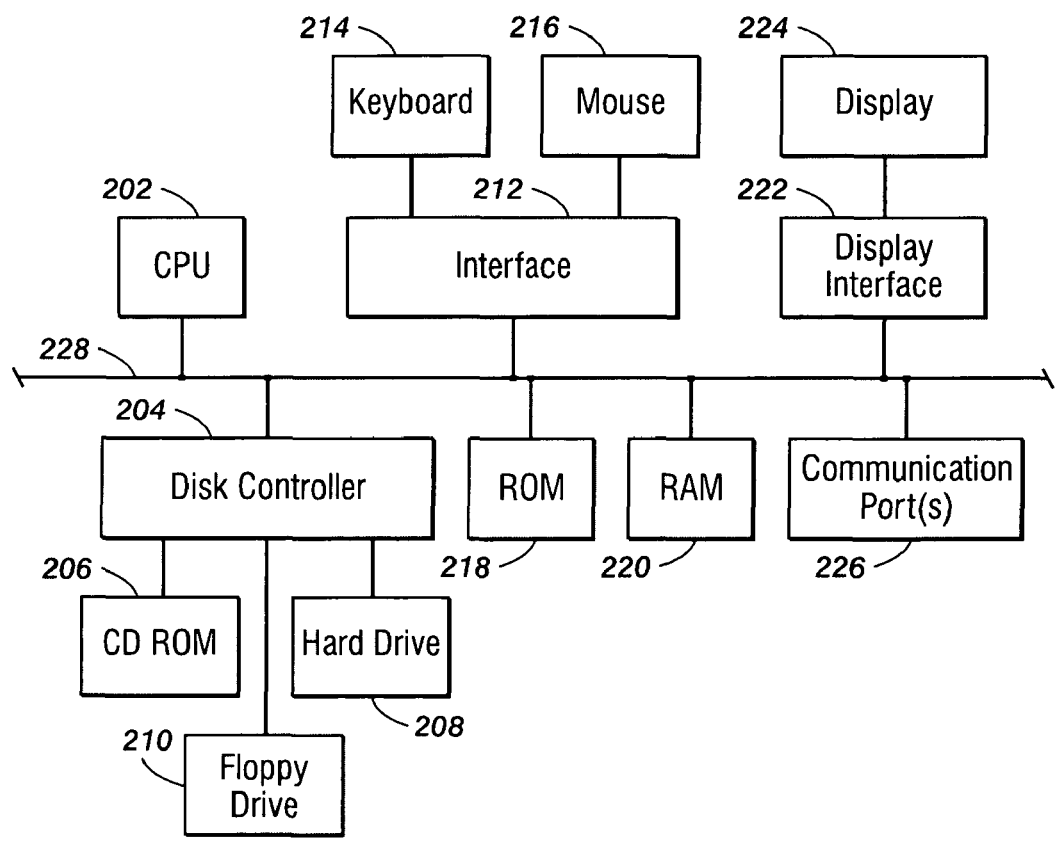
FIG. 5 is a block diagram of exemplary internal hardware that may be used to contain or implement the program instructions according to an embodiment.

FIG. 5 is a block diagram of exemplary hardware that may be used to contain and/or implement the program instructions of a system embodiment. Of course, any electronic device capable of carrying out instructions contained on a carrier such a memory, signal, or other device capable of holding or storing program instructions may be within the scope described herein. Referring to FIG. 5, a bus 228 serves as the main information highway interconnecting the other illustrated components of the hardware. CPU 202 is a central processing unit of the system, performing calculations and logic operations required to execute a program. Read only memory (ROM) 218 and random access memory (RAM) 220 constitute exemplary memory devices.

A disk controller 204 may interface with one or more optional disk drives to the system bus 228. These disk drives may be external or internal memory keys, zip drives, flash memory devices, floppy disk drives or other memory media such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to computer-type components, the hardware may also include an interface 212 which allows for receipt of data from input devices such as a keyboard 214 or other input device 216 such as a remote control, pointer and/or joystick. A display including touch-screen capability may also be an input device 216. An exemplary touch-screen display is disclosed in U.S. Pat. No. 4,821,029 to Logan et al., which is incorporated by reference herein in its entirety.

An embedded system may optionally be used to perform one, some or all of the operations of the methods described. Likewise, a multiprocessor system may optionally be used to perform one, some or all of the methods described.

The system and methods described herein may have multiple applications in various embodiments. For example, a Document Access Document may be particularly useful for publicly-traded companies when they release earnings reports, where the report may be prepared in advance, but access will not be permitted until a certain date. Thus, the Document Access Document may be sent to a pre-specified list of investors or others before the earnings report is released, and the Document Access Document may allow each holder to retrieve and print or e-mail a single copy of the earnings report only after the release date and time of the report.

It will be appreciated that various of the above-disclosed and other features and functions, or alternatives thereof, may be desirably combined into many other different systems or applications. For example, a "document" may include any item or device on which machine-readable instructions may be printed, embossed, stamped or otherwise contained in viewable form. Also, various presently unforeseen or unanticipated alternatives, modifications, variations or improvements therein may be subsequently made by those skilled in the art which are also intended to be encompassed by the following claims.

What is claimed is:

1. A method of retrieving a document from a document repository, comprising:
   receiving, by a computing device, a document comprising:
      a first portion comprising human readable information that is descriptive of a target file in a document repository, and
      a second portion comprising one or more machine-readable instructions for retrieving the target file, wherein the instructions comprise one or more conditions for retrieval of the target file, wherein the document does not comprise the target file;
   determining, by the computing device, whether to permit access to the target file by:
      verifying a digital signature on the document, and
      verifying that the conditions for retrieval are satisfied;
   in response to permitting access to the target file, automatically retrieving the target file from the document repository; and
   automatically delivering the target file to a target device.

2. The method of claim 1, wherein the machine-readable code comprises data glyphs.

3. The method of claim 1, wherein the target device comprises a printing device, and the delivering comprises printing the target file on the printing device.

4. The method of claim 1, wherein the target device comprises a combination scanner and printing device, the reading is performed by the target device, and the delivering comprises printing the target file on the target device.

5. The method of claim 1, wherein the verifying comprises applying a public key to the digital signature.

6. The method of claim 1, wherein reading machine-readable code contained on a document comprises reading machine-readable code representative of a location of the target file in the document repository.

7. The method of claim 1, wherein verifying that the conditions for retrieval are satisfied comprises verifying that a number of times that a user has accessed the target file does not exceed a threshold value, wherein the machine-readable code comprises the threshold value.

8. The method of claim 1, wherein verifying that the conditions for retrieval are satisfied comprises verifying that an amount of time for which the user has accessed the target file does not exceed a threshold value.

9. The method of claim 1, wherein verifying that the conditions for retrieval are satisfied comprises verifying a date after which the target file can be accessed.

10. A system for retrieving a document from a document repository, the system comprising:
    a computing device; and
    a computer-readable storage medium comprising one or more programming instructions which, when executed by the computing device, cause the computing device to perform a method comprising:
       receiving a document comprising:

a first portion comprising human readable information that is descriptive of a target file in a document repository, and a second portion comprising one or more machine-readable instructions for retrieving the target file, wherein the instructions comprise one or more conditions for retrieval of the target file, wherein the document does not comprise the target file, determining whether to permit access to the target file by:

verifying a digital signature on the document, and verifying that the conditions for retrieval are satisfied, in response to permitting access to the target file, automatically retrieving the target file from the document repository, and automatically delivering the target file to a target device.

11. The system of claim 10, wherein the one or more programming instructions for receiving a document comprise one or more programming instructions for receiving a document wherein the second portion comprises data representative of a location of the target file.

12. The system of claim 10, wherein the one or more programming instructions for verifying a digital signature comprise one or more programming instructions for applying a public key to the digital signature.

13. A system for retrieving a document from a document repository, the system comprising:

a computing device; and a computer-readable storage medium comprising one or more programming instructions which, when executed by the computing device, cause the computing device to perform a method comprising:

receiving, from a printing device, information comprising decoded data from at least a portion of a document, wherein the document comprises machine-readable code comprising one or more conditions for retrieval of a target file that is stored in a document repository, wherein the document does not comprise the target file;

determining whether to permit access to the target file by:

verifying a digital signature on the document, and verifying that the conditions for retrieval are satisfied, in response to permitting access to the target file, transmitting a digital data file corresponding to the target file to the printing device.

14. The system of claim 13, wherein the one or more programming instructions for receiving information comprise one or more programming instructions for receiving information from an optical scanner at the printing device.

\* \* \* \* \*